United States Patent Office 3,726,838
Patented Apr. 10, 1973

3,726,838
POLYURETHANE BASED COATING
COMPOSITIONS
Johannes Eimer and Erwin Windemuth, Leverkusen, Gerhard Berndt, Monheim, and Hans-Joachim Koch, Leverkusen, Germany, assignors to Bayer Aktiengesellschaft, Leverkusen, Germany
No Drawing. Filed Dec. 7, 1971, Ser. No. 205,721
Claims priority, application Germany, Dec. 9, 1970,
P 20 60 599.6
Int. Cl. C08g 22/16
U.S. Cl. 260—77.5 AQ        7 Claims

ABSTRACT OF THE DISCLOSURE

Polyurethane based coating compositions are prepared by reacting an organic polyisocyanate and a compound containing terminal hydroxyl groups reactive with isocyanates in the presence of a hydrophobic incorporation compound having the formula

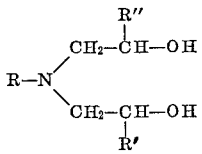

wherein R is a $C_{12}$ to $C_{20}$ alkyl, alkylcarbonyl or alkylaminocarbonyl the alkyl moiety of which contains 12 to 20 carbon atoms and R' and R'' are hydrogen or $C_1$ to $C_2$ alkyl.

The compounds of the invention are suitable for coating or bonding paper, textile sheet structures or films, organic or inorganic materials.

---

Coatings or preparations of supporting materials with isocyanate-based polyaddition products have been known for some time. For example, according to German patent specification No. 897,625, high molecular weight polyaddition products which are suitable for the production of coatings on sheet structures, for example papers or woven fabrics, can be obtained from relatively high molecular weight polyesters which may themselves also contain amide groups, and diisocyanates. A further development of this process is described in German patent specification No. 957,294, according to which the isocyanate-based starting materials used for finishing supporting materials are subjected to an after-reaction with polyisocyanates, resulting in the formation of crosslinked films, i.e. films that are insoluble in organic solvents. In addition, German patent specification No. 1,012,456 describes a process for the production of films, coatings for supporting materials, luting compositions and the like, in which branched isocyanate-modified polyhydroxy compounds which can also contain hetero atoms; aromatic, hydroaromatic or heterocyclic ring systems; or radicals that are reactive with isocyanate, are reacted with polyisocyanates or substances that are able to react like polyisocyanates under the influence of heat.

In the production of coatings on supporting materials in accordance with the aforementioned patent specifications, the natural tackiness of the products is often a disadvantage so that undesirable blocking of the coated supporting materials occurs in continuous cycle machine production. This troublesome behaviour can be avoided by using high molecular weight starting materials, or by using additives such as fatty acid salts of zinc, titanium, zirconium or tin in accordance with German patent specification No. 1,012,456.

Unfortunately, high molecular weight coating compositions can only form relatively dilute solutions in organic solvents, having, for example, a solids content of from 15 to 30%. It is uneconomical to work with such dilute solutions because, for example, the desirable application of large quantities per square metre involves a number of operations. On the other hand, the use of additives of the aforementioned kind complicates the coating process, simply through the need to use another process component which, moreover, occasionally causes troublesome side effects by exuding from the finished coatings. Finally, the coating compositions described in the aforementioned patent specifications give rise to difficulties during processing of their solids component, because in sheet form or in granulated form they show a tendency towards blocking at moderately elevated temperatures. Although this disadvantage can be obviated, for example, by adding talc during granulation of the starting materials, talc gives rise to hazing in the solutions during further processing of the starting materials, which is undesirable for transparent coatings.

It has now been found that novel polyurethane-based starting materials for coating compositions can be obtained when certain hydrophobic incorporation components containing an alkyl radical with 12 to 20 carbon atoms are used during production of the starting materials from polyhydroxy compounds and polyisocyanates. This procedure affords the following advantages:

(1) The starting materials are distinguished by reduced natural tackiness, either as solid rolled sheets or during further processing in granulate form. Generally, there is no longer any need to use such additives as talc in handling the solid substances.

(2) Because of the reduced natural tackiness of the starting materials for coatings, it is possible to use, for coating purposes, low molecular weight starting coating materials, which are more soluble in organic solvents, thus considerably increasing the economy of the process for applying coatings comprising the application of large amounts per square metre.

(3) When polyhydroxy compounds having a tendency towards crystallisation are used in the production of the starting materials for coatings, the hydrophobic incorporation components also act to inhibit crystallisation. As a result, it is possible with particular advantage to produce soft coatings on textiles, exhibiting outstanding technological properties without any effect upon the character of the textile.

(4) When hydrophobic incorporation components containing tertiary amine nitrogen are used, there is an accelerating effect upon the final crosslinking of the starting materials with polyisocyanates in addition to the reduced tackiness of the coatings, thus eliminating the need to use crosslinking catalysts.

Accordingly, the present invention relates to a process for the production of polyurethane-based coating compositions from polyisocyanates, compounds containing at least two groups that are reactive with isocyanates, and from 1 to 25% by weight, based on the total quantity of reagents, of hydrophobic incorporation components, the reagents being used in quantities corresponding to an NCO:OH ratio of 0.5:1, distinguished by the fact that the hydrophobic incorporation components are compounds corresponding to the general formula:

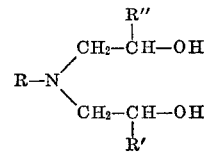

In the above formula:
R represents an alkyl radical having 12 to 20 carbon atoms, an alkylcarbonyl radical having 12 to 20 carbon atoms in the alkyl radical, or an alkylaminocarbonyl radical having 12 to 20 carbon atoms in the alkyl radical, whilst R' and R", which may be the same or different, represent hydrogen atoms or alkyl radicals having 1 to 2 carbon atoms.

The invention also relates to a coating composition which can be obtained by this process.

Finally, the invention also relates to the use of the coating compositions obtainable by this process for coating, preparing or bonding paper, textile sheet structures or films of organic or inorganic materials.

The incorporation components used in the process according to the invention are hydroxyalkylated fatty amines, hydroxyalkylated fatty acid amides and hydroxyalkylated substituted ureas corresponding to general Formulae I, II and III, in which R represents a linear or branched, saturated or unsaturated alkyl radical having 12 to 20 carbon atoms, and R' and R", which can be the same or different, each represents a hydrogen atom or a saturated alkyl radical having 1 to 2 carbon atoms.

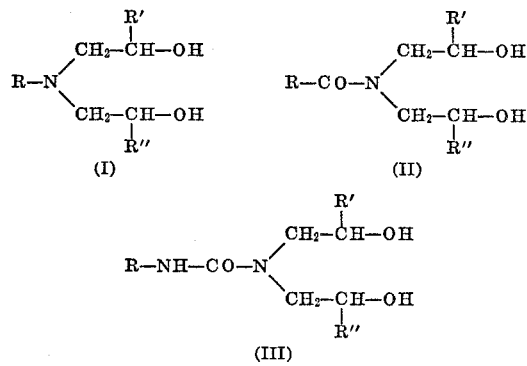

Hydrophobic incorporation components corresponding to general Formula I are substances which can readily be obtained from fatty amines having a linear or branched, saturated or unsaturated carbon chain and alkylene oxides, such as ethylene oxide, propylene oxide or butylene-1,2-oxide. Examples of suitable amines include those corresponding to the general formula:

$$CH_3—(CH_2)_n—NH_2$$

in which $n$ is an integer from 11 to 19, such as dodecylamine, hexadecylamine or stearylamine, and also those having a branched saturated or unsaturated carbon chain, such as 9-aminoheptadecane or oleylamine. These amines can be hydroxyalkylated into bis-hydroxy compounds by known methods; in this case, the substituents R' and R" in general Formula I are the same. If the amines are initially monohydroxyalkylated and the aminoalcohol formed is subsequently reacted with another alkylene oxide to form the bis-hydroxy compound, compounds in which substituents R' and R" are different are obtained. The following are examples of compounds corresponding to general Formula I: cetyl diethanolamine, stearyl diethanolamine, cetyl diisopropanolamine, stearyl diisopropanolamine, stearyl diisobutanolamine, stearyl isopropanol isobutanolamine and oleyl diethanolamine.

The hydroxyalkylated fatty acid amides of general Formula II as hydrophobic incorporation components are also substances that can readily be obtained, for example, from bis-hydroxyalkylamines corresponding to general Formul IV:

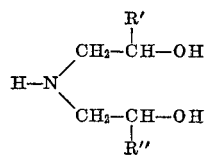

in which

R' and R", which can be the same or different, each represents a hydrogen atom or an alkyl radical having 1 or 2 carbon atoms, and a fatty acid derivative such as a fatty acid ester or fatty acid chloride. Examples of this group of compounds include stearic acid diethanolamide, palmitic acid ethanol isopropanolamide and oleic acid diethanolamide.

Finally, hydrophobic incorporation components corresponding to general Formula III can be obtained by reacting bis-hydroxyalkylamines of general Formula IV above with isocyanates of the general formula:

$$R—NCO$$

in which

R represents a linear or branched saturated or unsaturated hydrocarbon radical having 12 to 20 carbon atoms.

Examples of this group of compounds include N-stearyl-N',N'-bis-(2-hydroxyethyl) - urea, N-cetyl-N',N'-bis-(2-hydroxypropyl)-urea and N-stearyl-N'-(2-hydroxyethyl)-N'-(2-hydroxypropyl)-urea.

The hydrophobic alkyl radical which contains from 12 to 20, preferably from 16 to 18, carbon atoms is one characteristic common feature of the incorporation components to be used in the process according to the invention. In addition, they are characterised by two hydroxy groups, which enable them to be chemically incorporated into the starting materials for coatings according to the invention having reduced natural tackiness together with polyhydroxy compounds by reaction with polyisocyanates. In these polyaddition reactions, the compounds of general Formula I, because of their tertiary amine function, afford the additional advantage of catalytic activation of polyaddition reactions, both during preparation of the starting materials and also during the generally effected final cross-linking with further quantities of polyisocyanate.

Polyhydroxy compounds suitable for use in the process according to the invention include in particular linear or weakly branched polyesters, polyester amides, polyethers or polyacetals, preferably with terminal hydroxy groups.

The polyhydroxy compounds are obtained by known methods. Thus, for example, polyesters containing terminal hydroxy groups are obtained by reacting a polyfunctional, preferably difunctional, alcohol, for example ethylene glycol, hexamethylene glycol, triethylene glycol, tetraethylene glycol, pentaethylene glycol, hexaethylene glycol, dipropylene glycol, tripropylene glycol, pentapropylene glycol, heptapropylene glycol, trimethylol propane or hexane triol, with a less than stoichiometric amount of a polycarboxylic acid, especially a dicarboxylic acid, for example adipic acid or phthalic acid. Suitable polyester polyols can also be obtained by the polycondensation of ε-hydroxycarboxylic acids or by polymerisation of the corresponding lactones, for example ε-caprolactone. Polyesteramides can be obtained using diamines such as, for example, ethylene diamine or hexamethylene diamine, etc., during the reaction between polycarboxylic acid and polyol. Polyethers containing terminal hydroxy groups are obtained in known manner by the hydroxyalkylation, using suitable starter molecules, for example water of the afornmentioned polyhydric alcohols, aminoalcohols or amines with alkylene oxides such as ethylene oxide, propylene oxide or butylene oxide, or tetrahydrofuran. Polyacetals containing terminal hydroxy groups suitable for use in the process according to the invention are described, for example, in German patent specifications Nos. 1,039,744 and 1,045,095.

Compounds containing terminal hydroxy groups that are particularly preferred for use in the process according to the invention include aliphatic polycarbonates and/or polyester carbonates of the kind obtainable, for example, in accordance with German Offenlegungsschrift No. 1,915,908; British patent specification No. 1,211,811; or German Offenlegungsschrift 1,964,998.

Examples of suitable hydroxy compounds for the production of aliphatic polycarbonates by reaction with diaryl carbonates or phosgene include 1,4-butane diol, 1,5-pentane diol, 1,6-hexane diol, 1,8-octane diol, 1,12-dodecane diol, methyl and dimethyl-1,6-pentane diol, 1,6-hexane diol mono- and bis-2-hydroxyethyl ether, 1,6-hexane diol mono- and bis-5-hydroxycaproic acid ester, adipic acid bis-6-hydroxyhexyl ester, diethylene glycol, tri- and tetra-ethylene glycol, oligomeric polyethers of 1,2-propane diol with molecular weights of up to 700, 1,4-bis-hydroxymethyl cyclohexane, 4,4' - bis-2-hydroxy-2,2-dicyclohexyl propane, trimethylol propane or hexane triol.

Polyester carbonates suitable for use in the process according to the invention can be obtained in accordance with German patent application P 19 64 998.0 by condensing diols, for example 1,6-hexane diol; dicarboxylic acids, for example adipic acid; and diaryl carbonates, the 1,6-hexane diol being esterified with the adipic acid in a first stage using molar ratios of from about 4:1 to 8:1, followed by esterification with diaryl carbonate in a second stage, the diaryl carbonate being used in such a quantity that a molecular weight of preferably from 600 to 5000 is obtained in the case of terminal hydroxy groups. Polyester carbonates suitable for use in the process according to the invention can also be obtained in accordance with British patent specification No. 1,211,811, for example by reacting ε-caprolactone and/or ε-hydroxycaproic acid, 1,6-hexane diol and diaryl carbonates, in which case 1,6-hexane diol is initially reacted with ε-caprolactone or with ε-hydroxycaproic acid in a molar ratio of from 1:2 to 10:1 and the ester glycols formed are converted with diaryl carbonate into the required polyester carbonates.

The use of the polycarbonates and/or polyester carbonates in the process according to the invention affords a number of considerable advantages:

(1) Films obtained from the novel starting materials by crosslinking reactions, after application to or incorporation in supporting materials, are distinguished by outstanding mechanical properties.

(2) The polycarbonates and/or polyester carbonates are distinguished from other polyhydroxy compounds by a high degree of reactivty to isocyanates with which they are reacted. As a result, the reaction times required for completion of the polyaddition reactions are very considerably shortened and, when highly reactive aromatic isocyanates are used, the normally employed batch production technique can be replaced by more economical continuous-cycle production techniques using mixing machines. For the same reason, the novel starting materials for coatings can also be produced in solvents, thus dispensing with the need to dissolve the solid substance subsequently in a separate operation.

(3) Because the polycarbonates and/or polyester carbonates are unaffected by sunlight and ultra-violet light, extremely useful light-stable coatings are obtained, especially when aliphatic polyisocyanates are used.

The compounds containing hydroxy groups used in the process according to the invention have molecular weights of from 300 to 10,000, preferably from 600 to 5000, more particularly from 1000 to 3000.

The aforementioned polyhydroxy compounds can be used either individually or in admixture with one another.

In addition to the relatively high molecular weight polyhydroxy compounds, it is also possible to use low molecular weight chain extending agents having molecular weights of up to 300, for example ethylene glycol, propylene glycol, 1,4-butylene glycol, 1,6-hexamethylene glycol, trimethylol propane and hexane triol.

The polyisocyanates, preferably diisocyanates, used in the production of the novel starting materials for coatings are aliphatic, hydroaromatic or aromatic polyisocyanates. Examples include hexamethylene diisocyanate, 3-isocyanato - methyl - 3,5,5 - trimethyl - cyclohexyl - isocyanate, p- and m-xylylene diisocyanate, tolylene-2,4-diisocyanate and isomer mixtures of tolylene-2,4- and -2,6-diisocyanate, p - phenylene diisocyanate, 4,4'-diphenylmethane diisocyanate and 4,4'-diphenyldimethylmethane diisocyanate. Trifunctional or tetrafunctional polyisocyanates can be used in small quantities, examples including 1 - methyl-benzene-2,4,6-triisocyanate; triphenylmethane-4,4',4''-triisocyanate; polyisocyanates containing urethane groups, for example a triisocyanate with an NCO content of 19.2% obtained by reacting 1 mol of trimethylol propane and 3 mols of tolylene-2,4-diisocyanate and isocyanurate polyisocyanates obtained in accordance with German patent specification No. 1,203,792.

In one preferred method for producing the novel starting materials for coating from the described synthesis components, a mixture of polyhydroxy compound and hydrophobic incorporation component is reacted with a polyisocyanate, preferably a diisocyanate, at an elevated temperature of, for example, from 80 to 130° C. In the overall balance of the reaction of NCO and OH groups, the NCO:OH ratio should be from 0.5 to 1, preferably from 0.9 to 1.0. When the NCO:OH ratio is less than 1, OH-terminated polyaddition products are obtained. The molecular weights and hence the film-forming properties of the coating compositions according to the invention are primarily determined by the NCO:OH ratio. Thus, high molecular weight film-forming products are obtained when the NCO:OH ratio is greater than 0.9, whilst, when a lower NCO:OH ratio is used, non-film-forming products are formed and must be reacted during processing with a further quantity of a polyisocyanate or of another crosslinking agent.

In another method, the novel products are obtained by preparing, in a first stage, an NCO-containing adduct from a polyhydroxy compound with an excess of polyisocyanate and, in a second stage, reacting this NCO-containing adduct with the hydrophobic incorporation component. Once again, the NCO:OH ratio should be at most 1 or less than 1 in the overall balance.

Similarly, an NCO-containing prepolymer can be obtained, in a first stage, from a polyisocyanate and a mixture of a polyhydroxy compound with a hydrophobic incorporation component, and, in a second stage, reacting the prepolymer with a low molecular weight or relatively high molecular weight polyhydroxy compound which can also be a hydrophobic incorporation component, or water, or a diamine, or a dicarboxylic acid, or a bis-hydrazine.

Finally, the hydrophobic incorporation component can be incorporated by known methods, for example esterification or etherification, into polyhydroxy compounds which are subsequently converted, by reaction with polyisocyanates, into the end products of the process, the NCO:OH ratio being within the above-mentioned range.

In the methods of preparation described above, the quantity in which the hydrophobic incorporation components are used should be in the range from 1 to 25% by weight, preferably from 4 to 10% by weight, based on the total quantity of reagents.

In any event, the end products of the process must be soluble in organic solvents which do not contain any hydrogen atoms reactive with isocyanate, for example methylene chloride, ethyl acetate, butyl acetate, methyl ethyl ketone, benzene, toluene, chlorobenzene, tetrahydrofuran and diethyl formamide. This fundamental requirement also embodies a limitation in respect of the use of higher than bifunctional reaction components, whether polyhydroxy compounds or polyisocyanates. These higher functional components can be used in proportions which are greater, the lower the intended molecular weight of the end product.

The polyaddition reactions can be carried out in the presence or absence of solvents of the aforementioned kind, either at normal pressure or at elevated pressure. In order to accelerate the polyaddition reaction, it is occasionally possible to use known reaction accelerators for the NCO:OH reaction, for example tertiary amines or heavy metal compounds that are soluble in organic solvents.

The properties of the novel starting materials for coatings are governed to a large extent by the components used and, more particularly, by the polyhydroxy compound used and by the NCO:OH ratio employed. They can be in the form both of more or less viscous or plastic compositions, and of rollable or granulatable solids. In this connection, it is possible by appropriate selection of the starting components to obtain products which meet the coating and preparation requirements of any supporting materials. It is possible to produce starting materials for coating textiles, without any effect upon the textile properties thereof and, with equal effect, to coat paper or metal foils, in which case harder films are preferred. Unlike conventional polyurethane-based starting materials for coatings, the end products of the process according to the invention, because of the incorporation of hydrophobic components, have the particular advantage that, due to their reduced natural tackiness, they can be used in solutions of higher solids content, which generally improves the economy of processing.

To coat or prepare supporting materials with the OH-terminated end products, solutions of the products will generally be used. With high molecular weight starting materials which themselves show film-forming properties, there is no need for additional crosslinking. However, the use of polyisocyanates for the final crosslinking of starting materials affords particular advantages, because crosslinked end products which are insoluble in organic solvents and which exhibit improved service properties, are then obtained. Polyisocyanates suitable for this final crosslinking include, in particular, those of relatively high functionality such as polyisocyanates containing urethane groups, for example obtained by reacting 1 mol of trimethylol propane and 3 mols of tolylene-2,4-diisocyanate; isocyanurate according to German patent specification No. 1,203,792 or German Offenlegungsschrift 1,670,667; triphenylmethane-4,4',4''-triisocyanate; or biuret polyisocyanates according to German patent specification No. 1,101,394.

Following application to supporting materials, the film, which is still soluble immediately after it has been applied, becomes insoluble in organic solvents over a period of hours, in some cases a few days, through the gradual crosslinking of the OH-terminated starting coating material with the polyisocyanates, and thus loses its thermoplastic character. Films produced in this way satisfactorily withstand repeatedly applied cleaning operations using organic solvents. The final crosslinking can be accelerated by known isocyanate catalysts, such as tertiary amines or heavy metal compounds that are soluble in organic solvents; in determining the quantities in which these catalysts are used, consideration must be given to the particular processing technique used. In many instances, excessive shortening of pot-life is undesirable. It is of course also readily possible to use organic or inorganic fillers and pigments, metal powders such as aluminium bronze, plasticisers and other additives, for example release agents.

Final crosslinking of the starting materials can be carried out equally effectively with polyaddition and/or polycondensation products of melamine with aldehydes, preferably formaldehyde, and with etherification products of the methylol compounds of melamine with aliphatic saturated or unsaturated alcohols. Examples include hexamethylol melamine-hexamethyl ether and pentamethylol melamine-allyl ether. Condensation products of melamine/urea mixtures with formaldehyde and the etherification products obtainable therefrom can also be used equally effectively.

The novel starting coating materials can be used to coat supporting materials both on one side and on both sides. The process is also suitable for doubling sheet structures, for which purpose it is merely necessary to bring together the coated sides of one or two coated substrates, optionally under the effect of heat and pressure. After storage for a few days, the substrates have entered into an extremely firm bond. It is possible in this way to produce, for example, skins for collapsible boats, tonneau covers for motor vehicles and materials for heavy-duty working clothes. The end products of the process according to the invention are also suitable for impregnating fibre-based materials, such as woven textiles, felts or non-woven fibres, thus increasing the potential usefulness of these materials. Non-shift finishes can be similarly applied to woven materials, for example to those woven from glass fibre or monofil-spun polyamide fibres.

All the procedures referred to in the foregoing are carried out with solutions of the end products. It is possible to work without solvents or diluents if the starting materials are applied by calendaring to a supporting material, optionally using the aforementioned additives. This process has the considerable advantage that laminates with considerable weights of coating per square metre can be produced in a single operation. It is also possible in this way to coat elastic or semi-elastic foam films based on a natural or synthetic rubber or on polyurethanes, either on one or both sides. Supporting materials include sheet structures of many different kinds, such as fabrics woven from vegetable or synthetic, organic or inorganic fibres, knitted fabrics or non-woven fabrics, based on these materials, paper, leather, felt, films or foils of organic or inorganic materials.

The parts quoted in the examples are parts by weight.

EXAMPLE 1

475 parts of an adipic acid/ethylene glycol polyester (OH number 57.6) and 25 parts of stearyl diethanolamine (OH number 312) are dehydrated for 30 minutes at 130° C./15 torr. 54.6 parts of mixed tolylene-2,4- and -2,6-diisocyanates (isomer ratio 65:35) are added at 100° C., and the components are intimately mixed for 15 minutes at this temperature, poured into a container and then heated for 16 hours at 100° C. A tack-free sheet is rolled from the resulting hydroxyl-containing polyadduct which has a limited viscosity $$\eta_{DMF}^{25°\,C.} = 0.88$$

(cf. "Physik der Kunststoffe" (1961), Akademieverlag, Berlin, W. Holzmuller, K. Altenburg, p. 172).

7.5 parts of a 75% solution of a polyisocyanate synthesised from 1 mol of trimethylol propane and 3 mols of tolylene-2,4-diisocyanate are added to 100 parts of a 45% solution of the high polymer in ethyl acetate, and the mixture is applied in the form of a thin layer to a glass substrate.

After storage for 24 hours at room temperature, a tack-free soft, elastic and transparent film having a strength of 310 kp./cm.$^2$ and an elongation of 550% is obtained. Although the amine function incorporated accelerates final crosslinking, the batch is still processible after 24 hours.

The same solution applied to woven fabric produces thereon firmly adhering soft coatings which, providing the layer applied is strong enough, lead to a flexible finish on the woven fabric.

EXAMPLE 2

118.2 parts of hexamethylene diisocyanate are added at 100° C. to 1140 parts of an adipic acid/ethylene glycol polyester (OH number 57.3) and 60 parts of oleic acid diethanolamide (OH number 290) which had been dehydrated beforehand for 30 minutes at 130° C./15 torr. After it has been poured into a container, the mixture is heated for 16 hours at 100° C. An isocyanate-modified polyhydroxyl compound with a limiting viscosity $$\eta_{DMF}^{25°\ C.} = 0.6$$

is obtained.

8.3 parts of a 75% solution of a polyisocyanate obtained from 1 mol of trimethylol propane and 3 mols of tolylene-2,4-diisocyanate and 0.5 part of an accelerator prepared from 1 mol of N-methyl diethanolamine and 2 mols of phenyl isocyanate, are added to 100 parts of a 50% solution in ethyl acetate of the above-described polyhydroxyl compound.

Following application in the form of a thin layer to a glass substrate, and storage for 24 hours at room temperature, a tack-free, hard, slightly hazy and elastic film which is insoluble in organic solvents and which has a strength of 360 kp./cm.$^2$ and an elongation of 580% is obtained.

The same crosslinker-containing solution is applied by means of coating knives as a first coat in a quantity of 40 g./m.$^2$ to the rough side of a cotton flannel fabric weighing 80 g. per square metre. This is followed by drying for 28 minutes at 80° C. and then by a calender passage between a cotton roller and a steel roller under a light pressure of 2 t. per metre of fabric width. The fabric is then further coated several times with the following paste homogenised on a one-roll colour grinding mill until it has a total solids covering of 100 g. per sq. metre:

400 parts of a mixture of polyhydroxyl compound, crosslinking agent and accelerator,
40 parts of finely divided silica (matting agent),
10 parts of titanium dioxide (rutile) pigment, and
10 parts of cadmium pigment.

After each application, the fabric is dried at 80° C. The crosslinking reaction is over after storage for 24 hours at room temperature. A hard but flexible, light-stable, textile artificial leather resistant both to organic solvents and to abrasion is obtained, and can be used, for example, as a covering material or for the production of travel goods.

EXAMPLE 3

450 parts of polycaprolactone having an OH number of 56 and 50 parts of N-stearyl-N',N'-bis-(2-hydroxyethyl)-urea (OH number 278) are dehydrated for 30 minutes at 130° C./15 torr. 58.5 parts of hexamethylene diisocyanate are then stirred in and the resulting mixture is heated for 16 hours at 100° C. The polyaddition product thus obtained, which has a limiting viscosity $$\eta_{DMF}^{25°\ C.} = 0.78$$

can be rolled into a sheet and subsequently granulated.

7.5 parts of the isocyanate-containing reaction product described in Example 2, and 0.5 part of the accelerator prepared from 1 mol of N-methyl diethanolamine and 2 mols of phenyl isocyanate, are added to 100 parts of a 45% solution of the above-described high polymer in methyl ethyl ketone.

A cotton flannel fabric is coated in the same way as in Example 2, and a similar textile artificial leather is obtained.

EXAMPLE 4

117.6 g. of hexamethylene diisocyanate are added at 100° C. to 720 parts of an adipic acid/ethylene glycol polyester (OH number 52), 420 parts of an adipic acid/1,4-butane diol polyester (OH number 50.8) and 60 parts of stearyl diethanolamine (OH number 312) following dehydration. The mixture is heated for 16 hours at 100° C. in a container. An almost tack-free sheet is rolled from the resulting solid which has a limiting viscosity of $$\eta_{DMF}^{25°\ C.} = 0.8$$

and a granulate is prepared therefrom.

100 parts of a 40% solution in ethyl acetate are mixed with 6.3 parts of a 75% solution in ethyl acetate of the isocyanate-containing reaction product described in Example 2 and the resulting mixture is cast on to a glass substrate. A crosslinked, tack-free transparent film insoluble in organic solvents having a strength of 190 kp./cm.$^2$ and an elongation of 610% is obtained.

An artificial leather prepared in the same way as described in Example 2, usig a relatively heavy cotton velvetone fabric weighing 180 g. per square metre, shows greater softness with otherwise the same properties, and is eminently suitable for use as an artificial leather for upholstery purposes.

The following procedure can also be adopted to produce a pigmented coating on a fabric:

A mixture of the following components is prepared on conventional mixing rolls:

160 parts of isocyanate-modified polyhydroxyl compound,
40 parts of finely divided silica,
10 parts of titanium dioxide, and
10 parts of iron oxide brown.

This mixture is dissolved in 250 parts of ethyl acetate to which 25.2 parts of the above polyisocyanate have been added, and then applied to a woven fabric. After the solvent has been evaporated off at 50° C. to 70° C., a flexible, light-stable and soft coating, which is insoluble in organic solvents, is obtained after storage for 24 hours at room temperature.

EXAMPLE 5

In the manner described in the preceding examples, 95.5 g. of 3 - isocyanato-methylene-3,5,5-trimethyl-cyclohexyl isocyanate are added at 100° C. to 475 parts of a polytetrahydrofuran ether (OH number 85) and 25 parts of cetyl diisopropanolamine (OH number 312) following dehydration. After thorough mixing, the components are poured into a container and heated for 16 hours at 100° C. A thermoplastic solid with a limiting viscosity $$\eta_{DMF}^{28°\ C.} = 0.47$$

is obtained.

10 parts of a 60% solution in butyl acetate of a trimerisate containing 10.5% of NCO obtained from 1 mol of hexamethylene diisocyanate and 2 mols of tolylene-2,4-diisocyanate are added to 100 parts of a 45% solution in ethyl acetate of the above-described adduct.

Following application of a thin layer thereof to a glass substrate, an almost transparent film which is insoluble in organic solvents is obtained after storage for 24 hours.

EXAMPLE 6

160 parts of mixed tolylene-2,4- and -2,6-diisocyanate (isomer ratio 65:35) are added at 100° C. to 2000 parts of a block copolymer (OH number 52.6) obtained by known methods from 329 parts of cetyl diethanolamine and 1671 parts of caprolactone, followed by heating for 16 hours at 100° C. A polyaddition product with a limiting viscosity $$\eta_{DMF}^{25°\ C.} = 0.26$$

is obtained.

EXAMPLE 7

Following dehydration, 500 parts of adipic acid/diethylene glycol polyester (OH number 43) are mixed at 100° C. with 48.5 parts of hexamethylene diisocyanate, and the resulting mixture is heated for another hour at the same temperature. After the NCO content of the prepolymer has been determined (1.1%), 29 parts of N-stearyl-N',N'-bis-(2-hydroxyethyl)-urea dissolved in 200 parts of methyl ethyl ketone are added, corresponding to a calculated NCC:OH ratio of 0.99. After 10 minutes, another 500 parts of methyl ethyl ketone are added and finally, after 2 hours, a 30% viscous solution of the required polyaddition product is obtained by dilution with 6.5 parts of the same solvent.

6.5 parts of a 60% solution in butyl acetate of a trimerisate (10.5% NCO) obtained from 1 mol of hexamethylene diisocyanate and 2 mols of tolylene-2,4-diisocyanate are added to 100 parts of a 30% solution of the above-described reaction product. A film is cast onto a glass substrate. After 24 hours at room temperature, it can be readily peeled off from the substrate and is transparent, flexible and insoluble in organic solvents.

A dyed, polyamide taffeta weighing 60 g. per square metre is knife-coated with the same crosslinker-containing solution, and dried at 80° C. After storage for 24 hours at room temperature, a crosslinked, transparent and soft coating is obtained, with a solids covering of only 15 g. per square metre, being resistant to a hydrostatic pressure of 2000 mm. water column in accordance with DIN 53886. After 5 treatments in perchloroethylene in a standard commercial dry-cleaning machine, the fabric is still waterproof to an extent of 1800 mm.

The coated fabric is suitable inter alia for the production of fashionable rainwear and sports clothing.

EXAMPLE 8

Following dehydration, 475 parts of an adipic acid/diethylene glycol polyester (OH number 43) and 25 parts of N-cetyl-N',N'-bis-(2-hydroxypropyl)-urea are reacted at 100° C. with 55 g. of hexamethylene diisocyanate. After 1 hour, the adduct is found to have an NCO content of 1.2% and 19 g. of perhydro-bisphenol, corresponding to an NCO:OH ratio of 0.99, being added. After 2 hours, a 60% solution of the end product is prepared using 382 g. of toluene.

10 parts of the isocyanate-containing reaction product described in Example 2, and 0.5 part of the accelerator prepared from 1 mol of N-methyl diethanolamine and 2 mols of phenyl isocyanate, are added to 100 parts of the 60% solution in toluene of the above-described adduct.

Following application to a smooth substrate, a soft film which is insoluble in organic solvents is obtained after storage for 24 hours at room temperature.

The rough side of a cotton velvetone fabric weighing 180 g. per square metre is knife-coated with 20 g./m.² of the same crosslinker-containing solution, after which it is dried for 2 minutes at 80° C. and then smoothed between two steel rollers under a light linear pressure of 1 t. per metre of coating width.

Subsequent applications are carried out with the pigmented coating composition of Example 2 until a total solids covering of 100 g. per square metre is obtained, the material being dried at 80° C. after each application. The coating obtained shows outstanding abrasion resistance coupled with extreme softness attributable to the use of the soft first coat. It can be used as artificial leather for coating or upholstery purposes.

EXAMPLE 9

Following dehydration, 760 parts of a hexanediol polycarbonate (OH number 55.3) and 40 parts of N-stearyl-N',N'-bis-(2-hydroxyethyl)-urea (OH number 278) are mixed at 100° C. with 76.8 parts of hexamethylene diisocyanate, the resulting mixture poured into a container after 15 minutes and then heated for 16 hours at 100° C. A thermoplastic substantially non-tacky composition with a limiting viscosity $$\eta_{DMF}^{25°C.} = 0.56$$

is obtained, and can be rolled into a sheet that can be thoroughly crystallised and granulated after a few hours.

7.5 parts of a 75% solution of a polyisocyanate (crosslinker) synthesised from 1 mol of trimethylol propane and 3 mols of tolylene-2,4-diisocyanate are added to 100 parts of a 45% solution in ethyl acetate of the above-described polyadduct, and a thin layer of the resulting mixture is applied to a glass substrate.

After storage for 24 hours at room temperature, a tack-free, soft, light-stable transparent film with a strength of 355 kp./cm.² and an elongation of 450% is obtained. After a so-called "tropics" test carried out over a period of 12 days in a Weather-O-Meter at 70° C./95% relative humidity, the film has a strength of 270 kp./cm.² and an elongation of 420%. After exposure to light for 110 hours in a Xeno test, the strength of the film is 300 kp./cm.² and its elongation is 410%.

13 parts of finely divided silica and 9 parts of cadmium red are manually stirred into 100 parts of a 45% solution of the above polyadduct, and homogenised on a one-roll colour grinding mill. 7.5 g. of the accelerator mentioned in Example 2 are added to this pigment paste.

The paste is wet-coated on to a separating paper in a quantity of 60 g. per square metre using coating knives, and then dried for 3 minutes in a drying tunnel at a temperature rising from 80° C. to 110° C. In a second passage, an adhesive coating of a paste of 11.5 g. of the above crosslinking agent and 100 g. of a 70% solution of a polyaddition product prepared as follows, is wet-applied in a quantity of 100 g. per square metre.

1000 parts of a polyester carbonate (OH number 57.7) prepared by esterifying 1,6-hexane diol and adipic acid in a molar ratio of 6:1, followed by transesterification with diphenyl carbonate, are dehydrated for 30 minutes at 130° C./15 torr. 102 parts o 3-isocyanato-methyl-3,5,5-trimethyl-cyclohexyl isocyanate are added at 100° C., the components are stirred for 6 hours at this temperature followed by the preparation, using 472 parts of ethyl acetate, of a 70% solution of the polyaddition product having a viscosity $$\eta_{70\%}^{25°C.} = 49,600 \text{ cp}$$

A cotton fabric weighing 150 g. per square metre is placed on the still moist adhesive layer under slight pressure between rubber rollers, followed by drying for 3 minutes in the same way as described above.

After cooling, the coated textile can be readily detached from the separating paper. A soft, flexible textile coating with a tack-free surface is obtained, and is suitable for use, for example, as an artificial leather for clothing purposes.

EXAMPLE 10

Following dehydration, 560 parts of a hexane diol polycarbonate (OH number 56.3), 200 parts of an adipic acid/ethylene glycol polyester (OH number 56) and 40 parts of stearyl diethanolamine (OH number 312) are mixed with 81.6 parts of mixed tolylene-2,4- and -2,6-diisocyanate (isomer ratio 65:35), and the resulting mixture is intimately blended for 15 minutes, poured into a container, and heated for 16 hours at the same temperature. A sheet is rolled from the hydroxyl-containing polyaddition product which has a limiting viscosity $$\eta_{DMF}^{25°C.} = 0.52$$

7.5 parts of the isocyanate-containing crosslinking agent described in Example 9 are added to 100 parts of a 45% solution of the polyadduct in methyl ethyl ketone. The amine function incorporated accelerates final crosslinking, and the potlife amounts to more than 24 hours.

The soft transparent film obtained after storage for 24 hours at room temperature on a smooth substrate has the following properties: strength 205 kp./cm.²; elongation: 410%. After tropical testing for 6 days at 70° C./95% relative humidity: strength, 220 kp./cm.²; elongation, 440.

A cotton flannel fabric is coated in the same way as in Example 9 and a similar textile artificial leather is obtained.

EXAMPLE 11

92 parts of 3-isocyanato-methyl-3,5,5-trimethylcyclohexyl isocyanate are added at 100° C. to 475 parts of a polyester carbonate (OH number 81.4) obtained by reacting 1,6-hexaned iol and ε-caprolactone in a molar ratio of 1:1 followed by transesterification with diphenyl carbonate, and 25 parts of stearyl diethanolamine (OH number 312) following dehydration, and stirred intensively for 7 hours at this temperature. A 68% solution of the adduct is then prepared at 80° C., using 278 parts of ethyl acetate, and has a viscosity of $$\eta^{25°C.}_{68\%} = 16,900 \text{ cp}$$

100 parts of a 68% solution of the adduct in ethyl acetate are mixed with 15 parts of a 60% butyl acetate solution of a trimerisate (NCO μ 10.5%) obtained from 1 mol of hexamethylene diisocyanate and 2 mols of tolylene-2,4-diisocyanate, and the resulting mixture is applied in the form of a thin layer to a glass substrate. The transparent film insoluble in organic solvents, which is obtained after storage for 24 hours at room temperature, has the following properties: strength, 140 kp./cm.²; elongation, 310%. After tropical testing for 6 days at 70° C./ 95% relative humidity: 130 kp./cm.² and 290%.

The rough side of a cotton velvetone fabric weighing 180 g. per square metre is knife-coated with 20 g. per square metre of the same crosslinker-containing solution, dried for 2 minutes at 80° C. and then smoothed between two steel rollers under a slight linear pressure of 1 t. per metre of coating width.

The further applications are carried out with the pigmented coating composition of Example 9 until a total solids covering of 100 g. per square metre is obtained, the material being dried at 80° C. after each application. The coating obtained shows outsanding abrasion resistance, coupled with extreme softness attributable to the use of the soft first coat. It can be used as an artificial leather for clothing or upholstery purposes.

EXAMPLE 12

Following dehydration, 1120 parts of a hexanediol polycarbonate (OH number 55.3), 400 parts of an adipic acid/1,4-butane diol polyester (OH number 50.8) and 80 parts of N-stearyl-N',N'-bis-(2-hydroxyethyl)-urea (OH number 288) are mixed at 100° C. with 145.2 parts of hexamethylene diisocyanate, followed by intimate blending for 15 minutes. After the mixture has been poured into a container and heated for 16 hours at 100° C., a substantially tack-free thermoplastic coating composition having a limiting viscosity $$\eta^{25°C.}_{DMF} = 0.73$$

is obtained.

100 parts of a 40% solution of the polyaddition adduct in methyl ethyl ketone are mixed with 6.5 parts of the reaction product, described in Example 9, of trimethylol propane and tolylene-2,4-diisocyanate and 0.5 part of the accelerator prepared from 1 mol of N-methyl diethanolamine and 2 mols of phenyl isocyanate.

Following application to a smooth substrate, a soft, flexible and transparent film is obtained after storage for 24 hours at room temperature. The film has the following properties: strength, 305 kp./cm.²; and elongation, 470%. After tropical testing for 12 days (70° C., 95% relative humidity), the film has a strength of 200 kp./cm.² and an elongation of 100%. After exposure to light for 110 hours in a Xeno test, the film has a strength of 240 kp./cm.² and an elongation of 390%. Applied to fabrics, the film produces a soft, hydrolysis-resistant light-stable coating that is insoluble in organic solvents.

EXAMPLE 13

Following dehydration, 1000 parts of a polyester carbonate (OH number 55.3) prepared by esterifying 1,6-hexane diol and adipic acid in a molar ratio of 4:1, followed by transesterification with diphenyl carbonate, are mixed at 100° C. with 109 parts of mixed tolylene-2,4- and -2,6-diisocyanate (isomer ratio 65:35), and the resulting mixture is stirred for 1 hour. After the NCO content of the prepolymer has been determined (1.1%), 58 parts of N-cetyl-N',N'-bis-(2-hydroxypropyl)-urea dissolved in 400 parts of methyl ethyl ketone are added, corresponding to a calculated NCO:OH ratio of 0.99. After 10 minutes, another 100 parts of methyl ethyl ketone are added and, finally, after 2 hours a 30% viscous solution of the polyadduct is prepared, using 1323 parts of the same solvent.

100 parts of the 30% solution of the reaction product described above are admixed with 6.5 parts of a 60% solution in butyl acetate of a trimerisate (10.5% NCO) obtained from 1 mol of hexamethylene diisocyanate and 2 mols of tolylene-2,4-diisocyanate, and with 0.5 part of the accelerator described in Example 12. A film is cast on to a smooth substrate. After storage for 24 hours at room temperature, the film can readily be released from the substrate and is transparent, flexible and insoluble in organic solvents.

EXAMPLE 14

2.5 parts of a 60% solution of a melamine hexamethylol butyl ether dissolved in butanol and 2.5 parts of a 10% solution of maleic acid in ethyl alcohol, are added to 100 parts of the 30% solution in toluene of the adduct described in Example 13.

Following the addition of 18.5 parts of titanium dioxide pigment, 4.0 parts of inorganic blue pigment (Lichtblau 2R, Bayer Leverkusen), and 7.5 parts of kaolin, the paste is homogenised on a single-roll colour grinding mill and applied in several coats, using coating knives, to a light-weight polyamide fabric weighing 60 g. per square metre. After each application, the material is dried at 80° C. Coating is continued until a total solids covering of around 80 g. per square metre has been obtained. The coating is then after-heated for 5 minutes at 150° C., giving a soft, waterproof light-stable and weather-stable textile coating which can be dry-cleaned and which is is eminently suitable for the production of, for example, sleeping-bag materials or clothing.

What is claimed is:

1. A coating composition prepared by a process which comprises reacting an organic polyisocyanate in a first step with a compound containing at least two hydroxyl-groups and having a molecular weight of from about 300 to about 10,000 and an amine compound having the formula:

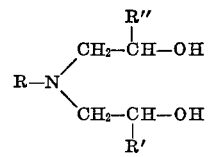

wherein
R is an alkyl radical containing 12 to 20 carbon atoms, an alkylcarbonyl radical containing 12 to 30 carbon atoms in the alkyl moiety or an alkylaminocarbonyl radical containing 12 to 20 carbon atoms in the alkyl moiety and R' and R" are the same or different and represent hydrogen atoms or alkyl radicals containing 1 or 2 carban atoms, at an NCO:OH ratio of 0.5:1 to 0.9:1, said amine compound being present in an amount of 1–25% by weight based on the total weight of the reactants employed in this step 1 to obtain a prepolymer containing free hydroxyl groups which prepolymer is soluble in organic solvents which are free of hydrogen atoms reactive with isocyanate groups, cross-linking the reaction product of step 1 in a second step with a polyfunctional cross-linking agent selected from the group consisting of organic polyisocyanates and reaction products of melamine with aldehydes or alcohols.

2. The composition of claim 1 wherein said amino compound is present in an amount from about 4 to about 10% by weight.

3. The coating composition of claim 1 wherein said NCO:OH ratio is 0.5:1.

4. The coating composition of claim 1 wherein said first named polyisocyanate is a diisocyanate.

5. The coating composition of claim 1 wherein said compound containing at least two terminal hydroxyl groups contains only two terminal hydroxyl groups.

6. The coating composition of claim 1 wherein said compound containing at least two terminal hydroxyl groups is a linear or weakly branched aliphatic polycarbonate or polyester carbonate having a molecular weight of from about 600 to about 5,000.

7. The coating composition of claim 1 wherein step 1 is carried out at a temperature of from about 80° C. to about 130° C.

References Cited

UNITED STATES PATENTS 3,307,948  3/1967  Thiens et al. _____ 260—77.5 AQ
3,639,354  1/1972  Müllen et al. ____ 260—77.5 AP DONALD E. CZAJA, Primary Examiner M. J. WELSH, Assistant Examiner U.S. Cl. X.R.

117—155 R, 161 KP; 260—75 NQ, 77.5 AP